United States Patent [19]

Takada

[11] Patent Number: 4,720,147

[45] Date of Patent: Jan. 19, 1988

[54] ADJUSTABLE VEHICLE SEAT BELT ANCHOR

[76] Inventor: Juichiro Takada, 3-12-1 Shinmachi Setagayaku, Tokyo, Japan, 105

[21] Appl. No.: 870,790

[22] Filed: Jun. 5, 1986

[30] Foreign Application Priority Data

Jun. 7, 1985 [JP] Japan .................. 60-124700
Jul. 29, 1985 [JP] Japan ............. 60-115209[U]
Jul. 29, 1985 [JP] Japan ............. 60-115210[U]

[51] Int. Cl.⁴ .............................................. B60R 22/24
[52] U.S. Cl. .................... 297/472; 280/808; 297/483; 297/486
[58] Field of Search ............... 297/471, 472, 480, 486, 297/483, 468, 473; 280/808

[56] References Cited

U.S. PATENT DOCUMENTS

| | | | |
|---|---|---|---|
| 4,111,459 | 9/1978 | Magyar | 297/468 X |
| 4,398,749 | 8/1983 | Hipp et al. | 297/483 X |
| 4,398,751 | 8/1983 | Wahlmann et al. | 297/486 X |
| 4,466,666 | 8/1984 | Takada | 297/468 X |
| 4,516,811 | 5/1985 | Akiyama et al. | 248/429 X |
| 4,536,011 | 8/1985 | Ono | 297/486 X |
| 4,547,018 | 10/1985 | Cunningham | 297/483 |
| 4,550,933 | 11/1985 | Patterson | 297/468 X |
| 4,560,204 | 12/1985 | Zeumer et al. | 297/468 X |
| 4,571,001 | 2/1986 | Hakansson | 297/468 X |

FOREIGN PATENT DOCUMENTS

| | | | |
|---|---|---|---|
| 2303222 | 8/1974 | Fed. Rep. of Germany | 297/483 |
| 2603979 | 8/1976 | Fed. Rep. of Germany | 297/468 |
| 2530977 | 1/1977 | Fed. Rep. of Germany | 297/468 |
| 31838 | 3/1981 | Japan | 297/468 |
| 2138670 | 10/1984 | United Kingdom | 297/483 |

Primary Examiner—Peter A. Aschenbrenner
Assistant Examiner—Thomas A. Rendos
Attorney, Agent, or Firm—Brumbaugh, Graves, Donohue & Raymond

[57] ABSTRACT

An adjustable vehicle seat belt anchor comprises an elongated rail member and a slide member slidably received by the rail member. The rail and slide members are of complementary cross sections, one being generally C-shaped with inturned and offset flanges along each side and the other being generally channel-shaped with out-turned and offset flanges along each edge. A spring-biased retaining pin is movable orthogonally to the direction of movement of the slide member into a selected hole in the rail member. A flange on the end of the pin forms a shoulder that can engage the back edge of the hole to prevent dislodgment of the pin under a high downward force. A deformable member positioned between the hole wall and the pin normally keeps the pin shoulder from engaging the hole edge but is deformed under a high force to permit such engagement.

4 Claims, 19 Drawing Figures

FIG. 1-PRIOR ART

FIG. 2
FIG. 3
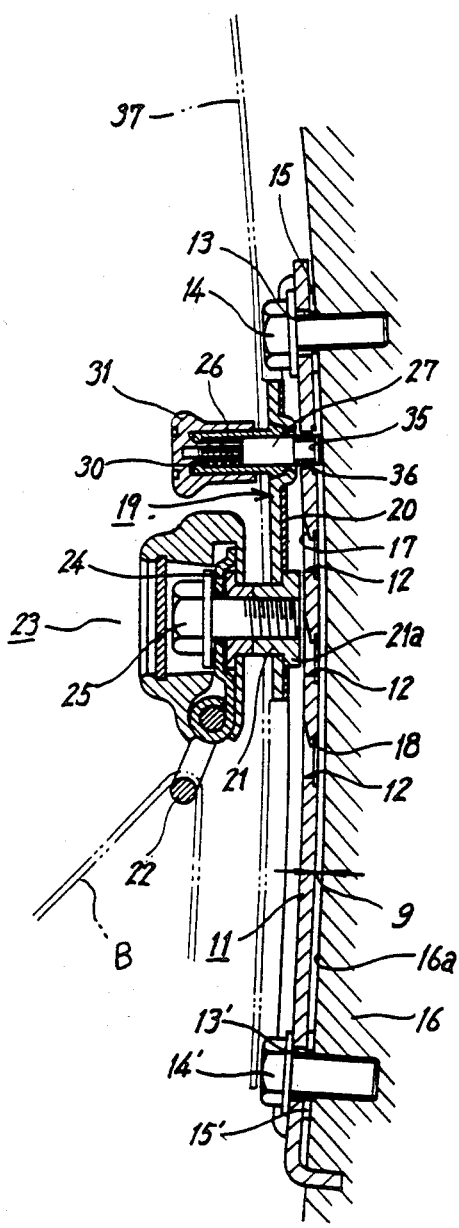
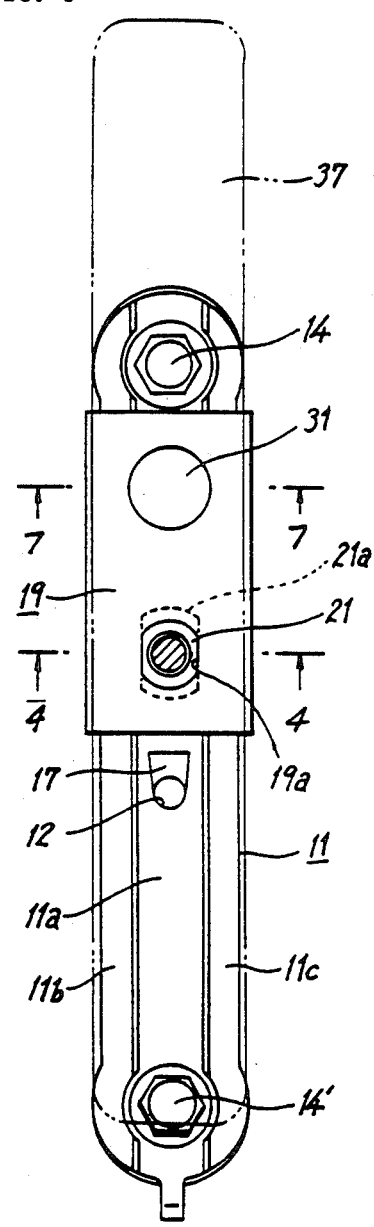

FIG. 11
FIG. 12
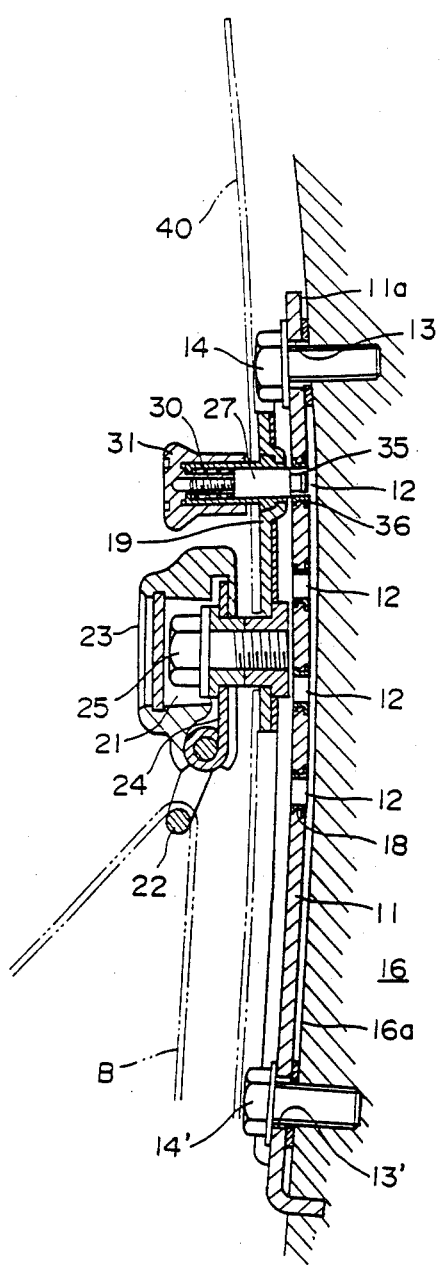
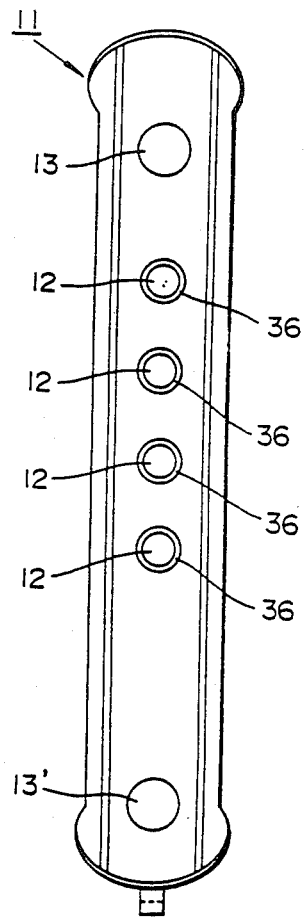

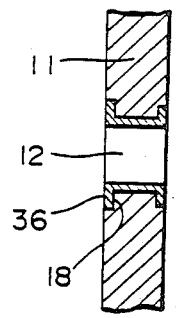
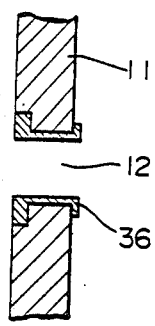
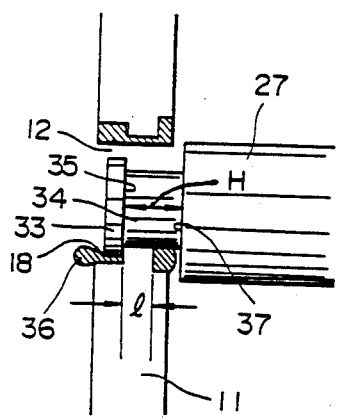
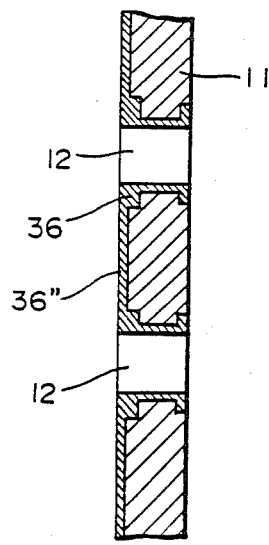
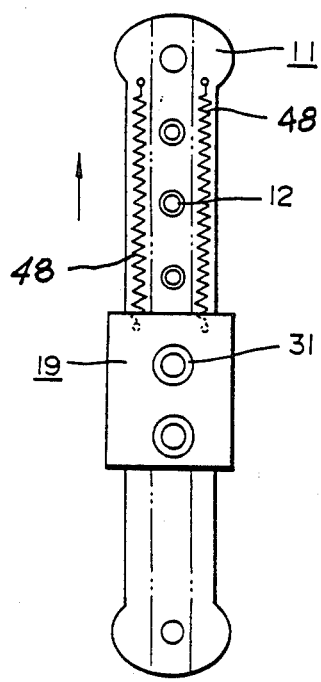

ADJUSTABLE VEHICLE SEAT BELT ANCHOR

DESCRIPTION

1. Field of the Invention

The present invention relates to a device for supporting and anchoring the upper attachment point of the shoulder portion of a vehicular seat belt system in a manner such that the height of the upper attachment point can be adjusted.

2. Background of the Invention

In the seat belt systems of automobiles and other motor vehicles, especially systems having belt portions engaging the torso and waist of a driver or passenger, it is common to provide for the upper end of a shoulder belt an anchoring device with a slip ring for supporting and anchoring an intermediate portion of the shoulder belt between a retractor and the vehicle occupant. It is also known to attach the slip ring in a manner to permit vertical adjustment along the center pillar, so that the shoulder of the driver or passenger may be accurately held by the belt.

In one adjustable seat belt anchoring device of the above-specified kind known in the prior art, which is shown in FIG. 1 of the accompanying drawings, a slide member 3 carrying a slip ring 2 for supporting and guiding a seat belt B is movably attached to an elongated rail member 1 affixed to the vehicle body S, such as to the center pillar. The slide member 3 is equipped at its upper portion with a retaining pin 4, which is normally biased by the action of a leaf spring 5 to protrude out from the back of the slide member 3. The rail member 1 has a plurality of longitudinally spaced-apart retaining holes 6, each of which can receive and release the tip end of the retaining pin 4. By pulling an operating knob 4' out in the direction of arrow X to extract the retaining pin 4 out of one of the retaining holes 6 of the rail member 1, the slide member 3 is set free to vertically move so that its height adjustment can be facilitated. For a more complete description and illustration of the adjustable anchor of FIG. 1, reference may be made to U.S. Pat. No. 4,466,666 (Aug. 21, 1984).

A seat belt anchoring device of the above type for adjustably positioning the member 3 by spring-loading a retaining pin 4 into a retaining hole 6 in the rail member 1 is advantageous over the screw type anchoring device used in the past, in that its operation is simple, quick and generally reliable. Despite these advantages, however, there is still left the following disadvantage: in an emergency, e.g., in case a very high load is exerted upon the seat belt as in a severe vehicular collision, the load on the seat belt is concentrated on the retaining pin 4 connecting the rail member 1 and the slide member 3, and the retaining pin 4 is susceptible of being forced out of engagement with the retaining hole 6 by flexure of the rail member 1 or by the deformation of the portion of the slide member in which the retaining pin 3 is mounted, so that the slide member 3 and the slip ring 2 move downwardly and permit the seat belt to slacken. Thus, the seat belt anchoring device thus far described still has room for improvement.

To solve the problem of release of the slide member 3 when a very high load occurs, it is possible to increase either the thickness of the metal plate used to make the rail member 1 or the length of the portion of the retaining pin 4 that projects through the retaining hole, thereby to enhance the rigidity of the rail member or to prevent release of the pin despite deflection and deformation of the rail and slider. In practice, however, if the rail member 1 is made thicker, there arises another problem—the weight of the anchor is increased and it is more difficult and costly to manufacture. If the retaining pin 4 is made longer, on the other hand, the clearance X (see FIG. 1) between the back of the rail member 1 and the surface of the vehicular body (e.g., the pillar) on which it is mounted has to be increased and so the anchoring device protrudes to an undesirable extent into the passenger compartment, and increases the possibility that the driver or passenger may accidentally hit his or her head against the anchoring device.

In the above type of adjustable anchor, i.e., one having a longitudinal internal channel along a rail member 1 of a C-shaped cross section receiving a slide anchor member 3 having a generally rectagular cross section, the total thickness T—see FIG. 1—of the anchor assembly will be not less than the sum of the substantial thickness of two plates, thickness ($t_1$) of the rail member 1 and thickness ($t_2$) of the slide member 3; a gap C for accommodating a boss 8' in the form of a flange in the slide member 3; and a clearance for slidably mounting the slide member 3 on the rail member 1. The thickness T must be estimated, then, to be at least at a value represented by an equation, $T=2(t_1+t_2)+C$. The thicknesses $t_1$ and $t_2$ of the plates must be at least two or three mm in order to provide sufficient strength.

For the purpose of eliminating the problem of the large total thickness of seat belt anchor devices of this type, it has been proposed to reduce the total thickness by, for example, an arrangement in which the slide member 3 is of a C-shaped cross section and slides on a flat rail member 1 (see Japanese unexamined patent publication No. 124545/1984). However, it is necessary in this type of device for the flat rail member 1 to be of considerable thickness in order to provide the required flexural rigidity. This member is, accordingly, difficult to manufacture and increases the weight of the device, and when the attachment nut 8 for the anchor bolt 7 is attached to the slide member 3, the attachment nut protrudes into the interior of the car and increases the total thickness of the device.

In consideration of problems of these conventional seat belt anchor devices, one aim of the present invention is to effectively use the dead space between the rail member and the side anchor member in order to eliminate these defects by an arrangement in which the rail member and the slide member, respectively, have specified shapes in cross section that are complementary to each other such as to reduce the total thickness, and a head portion of an attachment nut for fixing an anchor bolt is accommodated in the gap formed between the opposing base portions of the members.

Another aim of the invention is to provide a means to prevent the retaining pin from being forced out of the receiving hole when the seat belt is subjected to a very high load, which load is in turn exerted upon the slide member, while still using a metal plate for the slide and rail members that is comparatively thin and subject to deformation under loads produced by severe collisions.

SUMMARY OF THE INVENTION

The foregoing and other objects are attained, according to the present invention, by an improved adjustable vehicle seat belt anchor of the type having an elongated rail member provided with a multiplicity of longitudinally spaced-apart pin-receiving holes, a slide member slidably received on the rail member, a belt-supporting member attached to the slide member, a retaining pin mounted on the slide member such that it is movable into and out of any selected one of the pin-receiving holes in a direction orthogonal to the direction in which the slide member moves along the rail member, and a spring biasing the retaining pin in a direction to insert the retaining pin into one of the retaining holes in the slide member. The present invention is characterized in that the rail member and slide member are constituted by metal plates bent into complementarily shaped first and second cross sections, respectively, the first cross section being of generally "C" shape and including a base portion and an inturned flange portion along each edge of the base portion and offset from the base portion to define a longitudinally extending, inwardly open groove along each side thereof, the inner edges of the inturned flanges being spaced apart and defining a gap between them, and the second cross section being generally channel-shaped and including a base portion and a pair of out-turned flanges offset from the base portion, each out-turned flange of the second cross section being slidably received in a corresponding groove of the first cross section and the base portion of the second cross section being received in the gap between the inturned flanges of the first cross section.

The present invention is, preferably, further characterized in that the respective base portions of the first and second cross sections are spaced apart by a distance substantially equal to the offsets of the flange portions of the second cross section, thereby to define a space for receiving the head of a fastener by which the belt-supporting member is attached to the slide member.

According to another aspect of the invention, at least the portion of the retaining pin that is received within the pin-receiving holes and that faces downwardly has a recess spaced apart from the tip of the pin and forming a shoulder adjacent said tip end. A deformable member is interposed between said portion of the pin and the wall of the hole, the deformable member being adapted to support and guide the pin for free movement in the absence of a downward force on the pin less than a predetermined force and being adapted to deform upon a downward force on the pin in excess of the predetermined force, so that the pin shoulder engages an edge on the wall of the hole and the pin is thereby held in place in the hole against being forced out and releasing the slide member.

In a preferred embodiment of the last-mentioned characteristic, there is a recess in at least the lower portion of the wall of each hole that is of a shape complementary to the shape of the end part of the pin adjacent the pin shoulder, and the pin is received in the hole with its tip end substantially flush with the back surface of the rail member, whereby upon deformation of the deformable member the pin shoulder engages an edge of the hole wall defined by the hole wall recess.

The invention will now be described further with reference to the accompanying drawings of embodiments and variations of the embodiments.

DESCRIPTION OF THE DRAWINGS

FIG. 1 is an axial side cross-sectional view of an adjustable belt anchor known in the prior art;

FIG. 2 is an axial side cross-sectional view of a first embodiment of an adjustable belt anchor according to the present invention;

FIG. 3 is a front elevational view of the embodiment shown in FIG. 2, except that the belt attachment subassembly has been broken away;

FIG. 11 is an axial side cross-sectional view of a second embodiment of the invention;

FIG. 12 is a front elevational view of the rail member of the seond embodiment;

FIGS. 15, 16 and 17 are fragmentary detail cross-sectional views of other forms of resilient members for the second embodiment;

FIG. 18 is a front elevational view in generally schematic form of the second embodiment; and FIG. 19 is a fragmentary detail side cross-sectional view showing the interaction between the retaining pin and the pin receiving hole when the pin becomes subject to a very high force.

DESCRIPTION OF THE DRAWINGS

Figure 4:
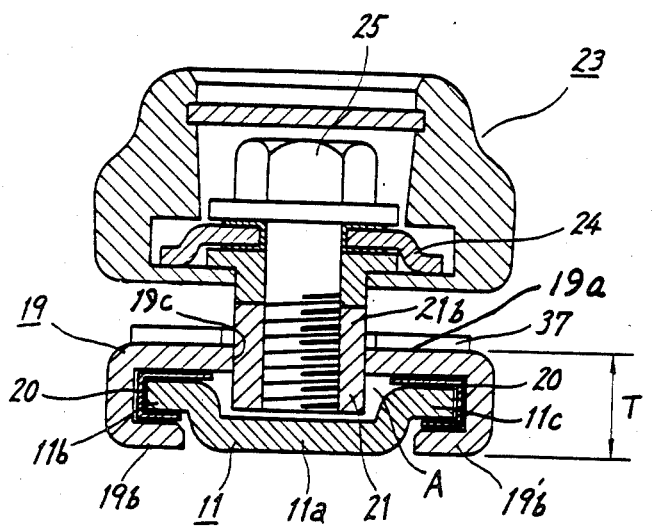
FIG. 4 is an end cross-sectional view of the embodiment of FIGS. 2 and 3 taken along the lines 4—4 of FIG. 3.

Referring first to FIGS. 2 to 4, reference numeral 11 denotes a rail member, which is formed by pressing a thick metal plate in the form of a strip such as to form a generally channel-shaped transverse cross section and to provide a given flexural rigidity and which has a plurality of engaging holes 12 formed therein along the longitudinal direction thereof. This rail member 11 is strongly secured to the car body by screwing attachment bolts 14 and 14', which are inserted through attachment holes 13, 13' formed in the upper and lower ends of the rail, through washers 15, 15' into a part of the car body, such as a center pillar, a given gap g being left between the rear surface of the back surface 11a of the rail member 11 and the surface 16a on the car body 16.

The rail member 11 has in its front face a series of sloping guide surfaces 17 for facilitating the insertion and detachment of a retaining pin 27 from each of a series of pin-receiving holes 12. On the back face of the rail member 11 around each engaging hole 12 is a recess 18.

Figure 5:
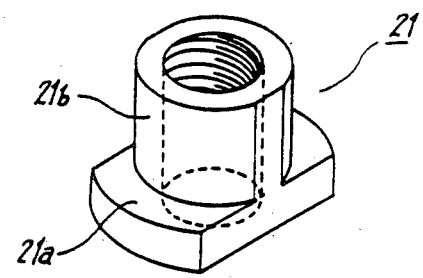
FIG. 5 is a pictorial view of the attachment nut for the belt attachment subassembly.

Numeral 19 denotes a slide member formed of a metal plate having a generally C-shaped cross section. As best seen in FIG. 4, the rail member 11 has, in cross section, a base portion 11a and an out-turned flange portion 11b, 11c along each edge of the base portion 11a that is offset forwardly (relative to the vehicle body) from the base portion. The slide member 19 has, in cross section, a base portion 19a and an inturned flange 19b, 19'b along each edge of the base portion that is offset rearwardly from the base portion. The cross-sections are complementarily shaped and dimensioned such that the side grooves defined by the inturned flanges 19b, 19'b of the slide member slidably receive the respective flanges 11b, 11c of the rail member, and the base portion 11a of the rail member is positioned in the gap between the inner edges of the slide member flanges 19b and 19'b. The base portions of the slide member and rail member are spaced apart to provide a space A between them. Sliding of the slide member along the rail member is facilitated by channel-shaped anti-friction members 20 installed in each groove of the slide member 11. An attachment nut 21 having a head portion 21a and a shank portion 21b is received in a hole 19c formed in the front face of the lower portion of the slide member 19 from the rear side thereof. The head portion 21a is welded to the inner surface of the slide member 19. When the slide member 19 is mounted on the rail member 11, the head 21a of the attachment nut 21 is accommodated in the space A defined between the base portions of the slide and rail members. An anchor bolt 25 is threaded into the threaded bore of the nut 21 and rotatingly supports a base portion 24 of an anchor 23 that holds and guides the shoulder portion of the seat belt by means of a belt ring 22. As shown in FIG. 5, the nut 21 has parallel flats on opposite sides of its head portion 21a such as to avoid interference with the rail member 11.

Figure 1:
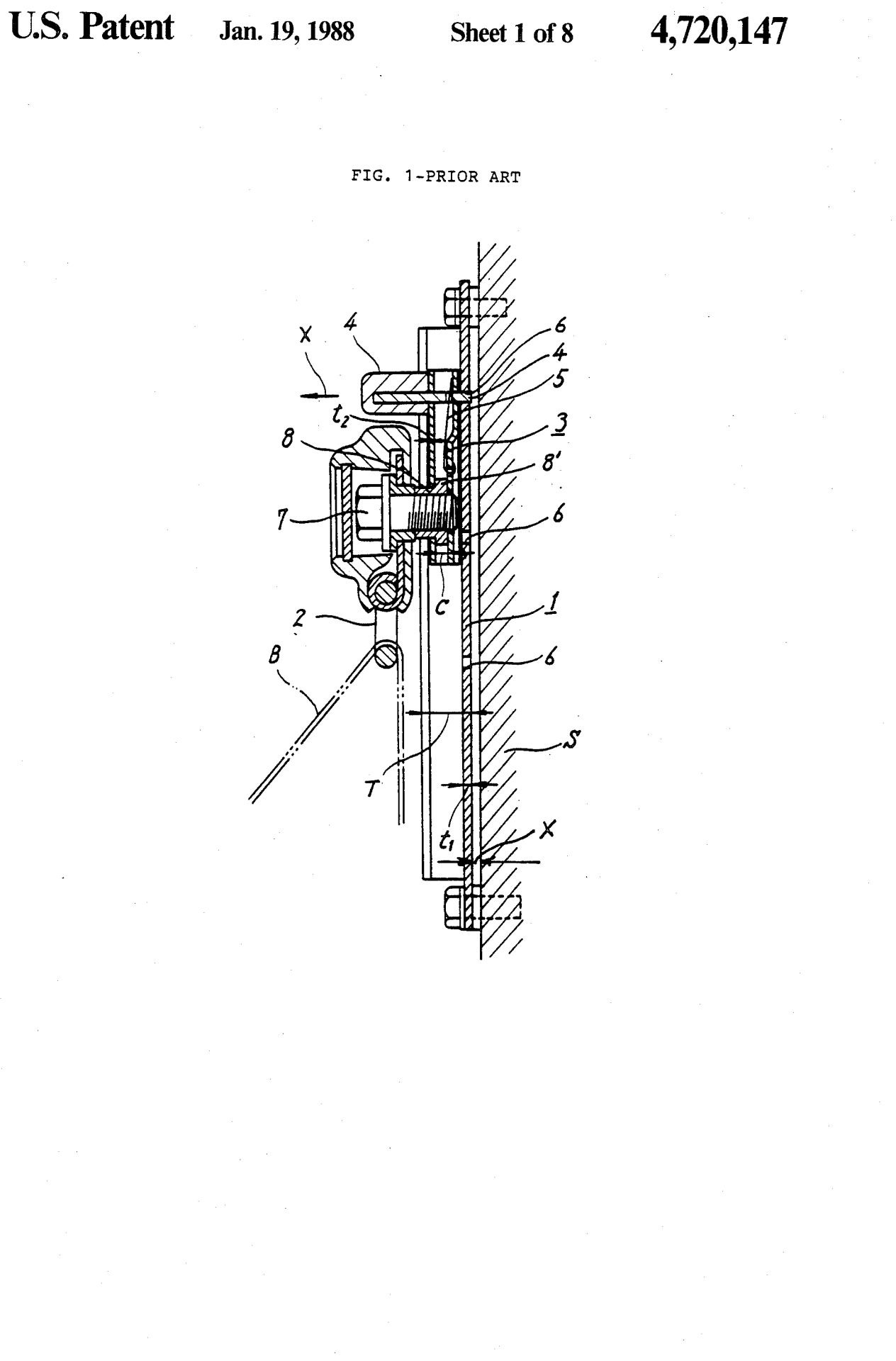
Figure 6:
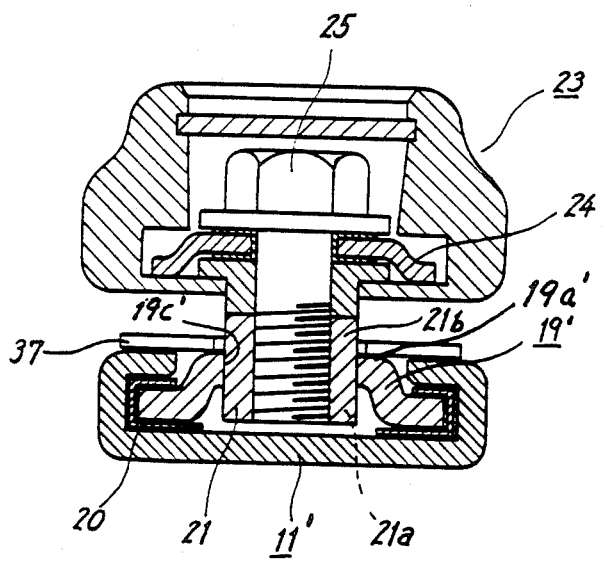
FIG. 6 is an end cross-sectional view taken along a plane corresponding to the one represented by the lines 4—4 of FIG. 3 of the first embodiment modified in respect of the cross-sectional shapes of the rail member and slide member.

As shown in FIG. 6, the same complementary geometry of the embodiment of FIG. 1 can be modified such as by reversing the cross sections of the rail and slide members. Thus, in FIG. 6, the rail member 11' is C-shaped in cross section and receives a channel-shaped slide member 19'.

Figure 7:
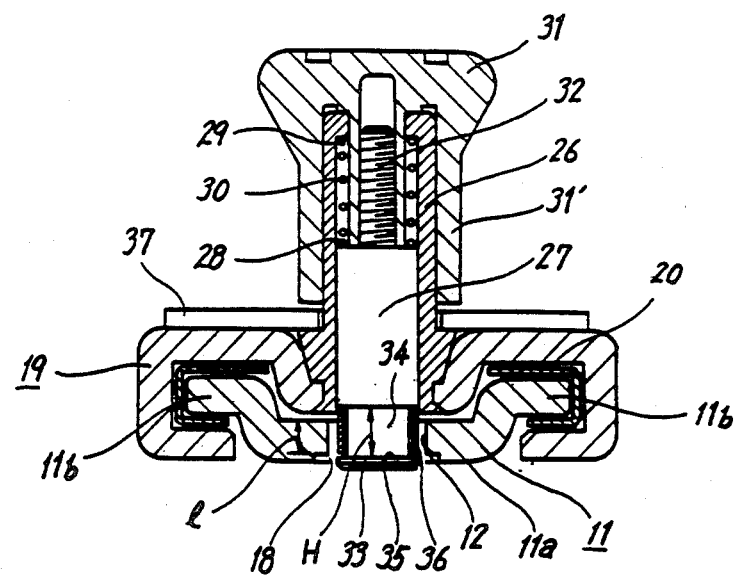
FIG. 7 is an end cross-sectional view of the first embodiment taken along the lines 7—7 of FIG. 3.

Referring now to FIG. 7, a pin-guiding sleeve 26 is affixed to the upper portion of the slide member 19, and a cylindrical retaining pin 27 is inserted into the guiding cylinder 26 such as to be slidable perpendicular to the direction of the movement of the slide member 19 along the rail member. The retaining pin 27 is constantly urged by a coil spring 30 engaged between a shoulder 28 on the pin and an internal flange 29 of the guiding sleeve 26, such as to be received in an engaging hole 12 of the rail member 11. Numeral 31 denotes a knob which is screwed onto a threaded portion 32 of the pin 27 and which has a skirt portion 31' covering the outer surface of the guiding cylinder 26.

The tip end of the pin 27 has a circumferential groove 34 having a width H that is larger than the depth 1 of the engaging hole 12 in the rail member 11. The groove 34 is spaced apart a small distance from the tip end of the pin such as to leave a circumferential flange 33 providing a shoulder 35 facing away from the tip. The flange 33 is located to be radially coextensive with the recess 18 on the back face of the rail member around each hole 12.

Figure 8:
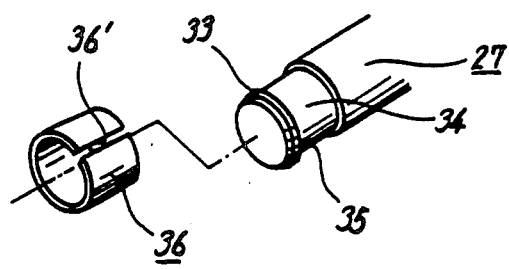
FIG. 8 is an exploded detailed pictorial view of the tip end of the retaining pin of the first embodiment.

Numeral 36 denotes a cylindrical ring which is received in the groove 34 in the pin 27 and which is made of a material that has a stiffness such that it is not deformed by the force applied when the belt is done up and the restrained occupant uses it in a normal way (e.g., connects and fits it or leans forward). When, however, it is forced against the inner surface of the engaging hole 12 by a very high load applied to the belt above a prescribed level, it is deformed or broken. It has a stiffness, therefore, in the latter emergency condition such as to allow the shoulder 35 of the pin 27 to move into the recess 18 in the back surface of the rail member. As shown in FIG. 8, the ring may be split to allow it to be pushed endwise from the tip end of the pin 27 into position in the groove 34, in which case it is retained in the groove 34 of the pin 27 by its resiliency. Alternatively, the pin can be inserted into a mold such as to directly mold the ring in situ in the groove 34.

Any resin material which is capable of satisfying the functional requirements for the above-mentioned mechanical performance can be used for the ring 36, although polyacetal resin and polyester resin are used most suitably.

The ring 36 has an outer peripheral surface substantially flush with the outer peripheral surface of the pin 27 so that the pin can be moved freely into and out of a rail hole 12 without interference by a discontinuity at the juncture of the ring 36 with the flange 33.

In the drawings, reference numeral 37 designates a cover which covers a rail member 11 and a slide member 19, leaving only a longitudinal slot for movement of the slide assembly.

In the embodiment the total thickness T of the rail member and slide member does not exceed the depth or thickness of the slide member 19 itself, the back surfaces of the slide member flanges 19b, 19'b being flush with the back surface of the rail member (see e.g., FIG. 4). The head 21a of the mounting nut 21 is positioned within the space A formed between the rail member 11 and the slide member 19, so that it can be securely affixed to the slide anchor member 19 without increasing the overall thickness of the anchor device, whereby the anchor 23 can be maintained at the required strength through the intermediary of the anchor bolt 25.

In the seat belt anchor device of the invention having the above-described construction, the vehicle occupant vertically adjusts the slide member 19 so as to obtain the height of the belt anchor 23 which suits the stature of his or her body and the position of the vehicle seat. To this end, the occupant first pulls a knob 31 and withdraws the engaging pin 27 from the engaging hole 12 in the rail member 11. When the slide member 19 is moved along the rail member, the retaining pin 27 automatically projects into an engaging hole 12 by the biasing force of the spring 30 whenever the occupant releases the knob 31 after sliding the slide anchor 19 to a desired position, whereby the position of the belt anchor 23 is held at the desired level.

In this case, the ring of resilient material 36 is not at all deformed by the stress which is ordinarily caused by the use of the seat belt B, and the shoulder 35 of the pin 27 cannot engage the edges of the hole 12, whereby the insertion and withdrawal of the engaging pin 27 are facilitated. Also, the resilient material provides a cushion between the outer surface of the pin 27 and the inner surface of the hole 12, thus preventing generation of noise during running of the vehicle. In a collision or other emergency that causes a force of, for example, 200 Kg to 3 tons, to be applied to the seat belt B, a component of the force acts in the direction perpendicular to the engaging pin 27 through the anchor 23 and the slide member 19, whereby the resilient material of the ring 36 is deformed by the inner surface of the retaining hole 12, whereby the shoulder 35 of the pin 27 engages the end wall of the recess in the hole 12, whereby disengagement of the pin 27 from the hole is prevented. Therefore, the security of the connection between the slide and rail members is ensured so as to prevent the slide member 19 from moving and so as to properly restrain the seat occupant.

Figure 9:
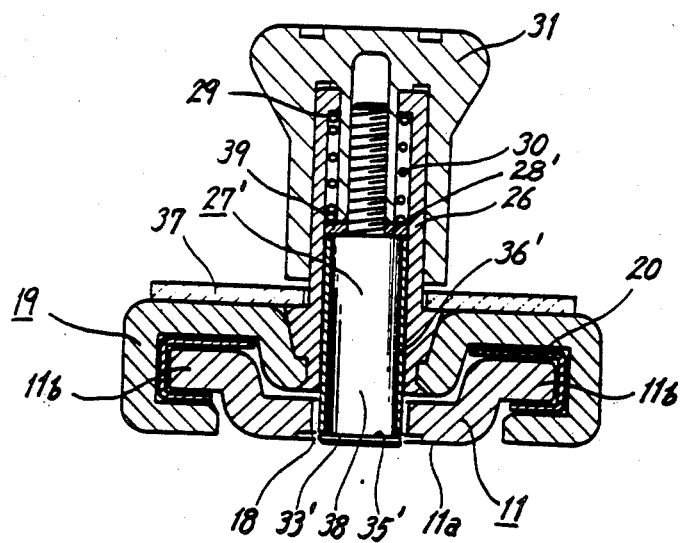
FIG. 9 is an end cross-sectional view, the same in form as FIG. 7, but shows the modified construction for the retaining pin.

As shown in FIG. 9, the retaining pin 27' can be of a lesser outer diameter than the receiving sleeve 26 to provide a surface 38 equivalent to the groove 34. A tube 36' of resilient material is received on the surface 38 and is clamped between the shoulder 35' of a flange 33' and a washer 39 mounted at the shoulder 28'. In FIG. 9, the elements and portions denoted by the same reference numerals as those of FIG. 7 indicate identical elements and portions. The tube 36' prevents noise that might occur from vibration-caused contact between the sleeve 26 and the pin 27. The deformation of the resilient material 36 is also facilitated to improve the engagement between the shoulder 35 and the circumferential edge 18 of the pin-receiving hole 12.

Figure 10:
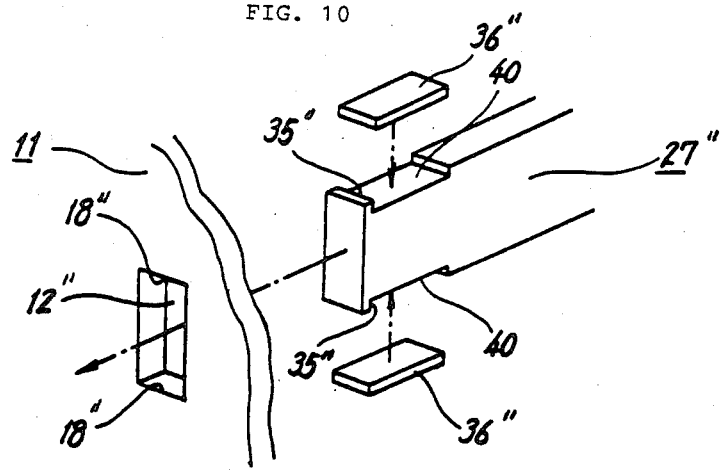
FIG. 10 is an exploded detail pictorial view, in generally schematic form, of another modified retaining pin design.

FIG. 10 shows still another modification of the belt anchor device according to the present invention. This modification corresponds to the case in which the holes 12" of the rail member 11" and the retaining pin 27" have square (or rectangular) shapes. The portion of the retaining pin 27" received in the retaining holes is formed in its upper and lower faces with notches 40 which define shoulders 35" and in which blocks 36" of resilient material are received. Like the other structures described above, the lower block 36" is deformed by the pressure of the lower face of the retaining hole 12", when a high load directed downward is exerted upon the retaining pin 27", so that the shoulder 35" of the lower notch 40 comes into engagement with the edge 18" of the retaining hole 12" to prevent the retaining pin 27" from coming out and the slide member 19 from moving.

In the embodiment thus far described, an adjustable anchor is used as the seat belt support 23 to guide and hold a portion of the shoulder belt B. The anchor device of the present invention can also be used with a buckle connected to the vehicle body above the shoulder of the driver or passenger. In this modification, the buckle is attached to the slide member in place of the anchor ring, and a tongue stitched to the end of the seat belt is detachably connected to the buckle.

FIGS. 11 to 19 show a second embodiment and variations thereof that are identical or nearly identical to the embodiments and variations shown in FIGS. 1 to 10, except in the respects described below. For the most part, the foregoing description is fully applicable to the embodiments and variations of FIGS. 11 to 19, and the corresponding components and portions of components have, therefore, been assigned the same reference numerals in FIGS. 11 to 19 as in FIGS. 1 to 10.

Figure 13:
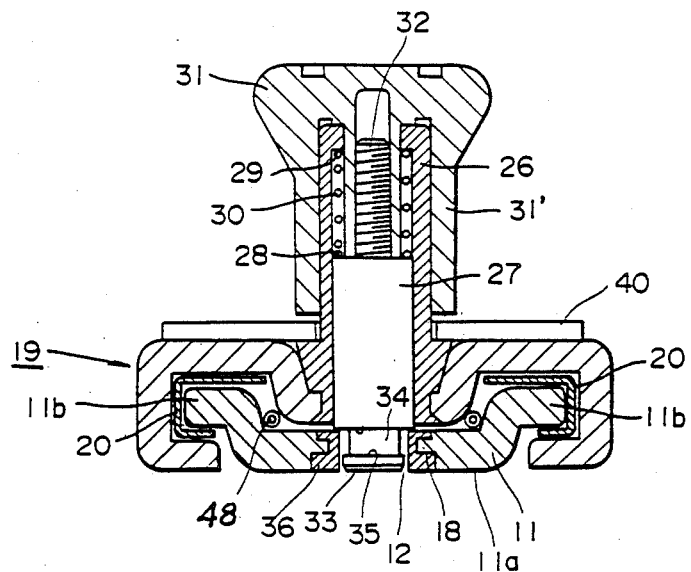
FIG. 13 is an end cross-sectional view of the second embodiment taken along a transverse plane that includes the axis of the retaining pin.
Figure 14:
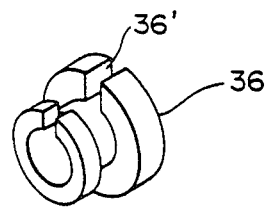
FIG. 14 is a pictorial view of the resilient member of the second embodiment.

Referring to FIG. 13, it may be seen that instead of providing a ring or block of resilient material in a recess on the retaining pin 27, a grommet form of ring 36 is installed within each pin-receiving hole 12, in the rail member 11. For example, the ring 36 may have slits 36' in the flange portions to enable it to be pressed into place in the holes 12. As shown in FIG. 19, when a high force in the downward direction is applied to the retaining pin 27, the portion of the ring 36 below the groove 34 of the pin and below the flange 33 of the pin are deformed, thereby allowing the lower part of the pin flange 33 to move down in the recess 18 so that the shoulder belt 35 on the pin engages the edge of the hole 12, whereupon the pin is captured and cannot be forced out of the hole.

FIGS. 15 and 16 show variations of the shapes of the grommet-like rings of the second embodiment and are self explanatory. As in the rings of resilient material described above, the rings shown in FIGS. 13, 15 and 16 can be molded in situ onto the rail member. In the case of FIG. 17, in addition to molding the rings within the holes 12, a continuous layer 36" of resilient material of resin material can be molded on the rail member, together with the rings molded within the holes 12.

As may be observed in FIGS. 13 and 18, the second embodiment also incorporates a pair of tension springs 48 coupled between the upper part of the rail member 11 and the slide member 19. It is apparent that the springs 48 bias the slide member in an upward direction and facilitate upward adjustment of the slide member on the rail member. The springs can be designed to provide a force on the slide member that is just slightly less than the force applied to the slide member through the belt member by the belt retractor and by the weight of the slide member, the components mounted on the slide member and the belt itself. As in the first embodiment, a cover 40 can be included.

I claim:

1. An adjustable vehicle seat belt anchor comprising:
   an elongated rail member having a multiplicity of longitudinally spaced-apart pin-receiving holes;
   a slide member slidably received for movement longitudinally along the rail member;
   a belt-supporting member attached to the slide member;
   a retaining pin mounted on the slide member such that it is movable into and out of any selected one of the pin-receiving holes in a direction orthogonal to the direction in which the slide member moves along the rail member and having a portion received in the pin-receiving hole, said portion having a tip and having a groove which is spaced apart from the tip to thereby form a pin flange at the tip thereof;
   a spring biasing the retaining pin in a direction to urge the retaining pin into one of the pin-receiving holes in the rail member; and
   a deformable member received in the groove of the retaining pin, the deformable member having a stiffness such that it is not deformed until an abnormal load is applied to the belt but upon such an abnormal load deforms such that the pin flange engages an outer edge of the pin-receiving hole.

2. An adjustable vehicle seat belt anchor according to claim 1, wherein there is a recess of a shape complementary to the shape of the pin flange at the outer edge of each of the pin-receiving holes.

3. An adjustable vehicle seat belt anchor comprising:
   an elongated rail member provided with a multiplicity of longitudinally spaced-apart pin-receiving holes;
   a slide member slidably received for movement longitudinally along the rail member;
   a belt-supporting member attached to the slide member;
   a retaining pin mounted on the slide member such that it is movable into and out of any selected one of the pin-receiving holes in a direction orthogonal to the direction in which the slide member moves along the rail member and having a portion received through the pin-receiving hole, said portion having a tip and having a groove which is spaced apart from the tip to thereby form a pin flange at the tip thereof;

a spring biasing the retaining pin in a direction to urge the retaining pin into one of the pin-receiving holes in the rail member; and a deformable member attached within each pin-receiving hole, said deformable member having a stiffness such that it is not deformed until an abnormal load is applied to the belt but upon such abnormal load deforms such that the pin flange engages an outer edge of the pin-receiving hole.

4. An adjustable vehicle seat belt anchor according to claim 3, wherein there is a recess of a shape complementary to the shape of the pin flange at the outer edge of each of the pin-receiving holes.

* * * * *